US012680688B1

(12) United States Patent
Lin

(10) Patent No.: US 12,680,688 B1
(45) Date of Patent: Jul. 14, 2026

(54) SOLAR-POWERED POOL FOUNTAIN LIGHT, FOUNTAIN LIGHT ASSEMBLY, AND SWIMMING POOL SYSTEM

(71) Applicant: Shenzhen Laimi Wisdom Nexus Technology Co., Ltd., Shenzhen (CN)

(72) Inventor: Zhipei Lin, Shenzhen (CN)

(73) Assignee: Shenzhen Laimi Wisdom Nexus Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/538,890

(22) Filed: Feb. 12, 2026

(51) Int. Cl.

| | |
|---|---|
| ***F21V 29/70*** | (2015.01) |
| ***E04H 4/12*** | (2006.01) |
| ***F21S 8/00*** | (2006.01) |
| ***F21V 33/00*** | (2006.01) |

(52) U.S. Cl.
CPC ............... *F21V 29/70* (2015.01); *E04H 4/12* (2013.01); *F21S 8/00* (2013.01); *F21V 33/006* (2013.01)

(58) Field of Classification Search
CPC ................ E04H 4/12; F21W 2121/02; F21W 2131/308; F21V 33/006; F21V 29/70; F21S 8/00; F21S 10/00
See application file for complete search history.

(56) References Cited

U.S. PATENT DOCUMENTS

2007/0097270 A1* 5/2007 Shih ................ H04N 21/42607 348/554
2025/0314088 A1* 10/2025 Huang ..................... E04H 4/14

FOREIGN PATENT DOCUMENTS

CN 223811177 U * 1/2026

OTHER PUBLICATIONS

Innovation Q+ NPL Search. (Year: 2026).*

* cited by examiner

*Primary Examiner* — Anabel Ton
(74) *Attorney, Agent, or Firm* — Westbridge IP LLC

(57) ABSTRACT

A solar-powered pool fountain light includes a water supply component, a solar module, and at least one fountain light assembly. The fountain light assembly includes a water jetting component having a water jetting chamber, a lamp assembly, and a first electrical connector. At least one water jetting hole is defined in a side wall of the water jetting chamber. The lamp assembly includes a housing, a lighting lamp set sealed within the housing, and a first electrical connector. A light-transmitting area is provided on the housing corresponding to the position of the lighting lamp set. The lamp assembly is detachably connected to the water jetting component. The light-transmitting area is arranged adjacent to the water jetting hole. The first electrical connector is respectively electrically connected to the lighting lamp set and a solar panel.

20 Claims, 12 Drawing Sheets

SOLAR-POWERED POOL FOUNTAIN LIGHT, FOUNTAIN LIGHT ASSEMBLY, AND SWIMMING POOL SYSTEM

TECHNICAL FIELD

The present disclosure relates to the field of pool fountain lights technology, and more particularly, to a solar-powered pool fountain light, a fountain light assembly, and a swimming pool system.

BACKGROUND

Swimming is one of the most popular sports among people. However, the use of outdoor swimming pools is constrained by lighting conditions at night. To address this issue, lighting fixtures designed for swimming pools have been developed. At the same time, to enhance the enjoyment of using swimming pools, water jetting structures capable of forming fountains have also been incorporated into the lighting fixtures.

However, in technical solutions in related fields, the structure of the lighting fixture with such a water jetting structure is unreasonable, resulting in inconvenience during maintenance and being unfavorable for long-term user experience.

SUMMARY

The primary objective of the present disclosure is to provide a solar-powered pool fountain light, aiming to enhance the convenience of maintenance and reduce maintenance costs for the solar-powered pool fountain light.

To achieve the aforementioned objectives, the solar-powered pool fountain light provided in the present disclosure includes:

a water supply component having a water supply channel; one end of the water supply channel being in communication with a swimming pool, and the other end of the water supply channel extending above a water surface of the swimming pool;

a solar module being mounted on the water supply component; the solar module including a solar panel being exposed above the water surface of the swimming pool; and at least one fountain light assembly, including:

a water jetting component detachably connected to the water supply component; wherein the water jetting component includes a water jetting chamber, and at least one water jetting hole is defined in a side wall of the water jetting chamber, and each of the at least one water jetting hole communicates the water jetting chamber with an exterior of the water jetting component; one end of the water jetting component is a closed end, while the other end of the water jetting component is an open end in communication with the jetting chamber; and the open end is configured to be in communication with the end of the water supply channel that is exposed above the water surface; and a lamp assembly including a housing, a lighting lamp set sealed within the housing, and a first electrical connector; wherein a light-transmitting area is provided on the housing corresponding to a position of the lighting lamp set, such that light emitted by the lighting lamp set passes through the light-transmitting area; the lamp assembly is detachably connected to the water jetting component, and the light-transmitting area is arranged adjacent to the water jetting hole;

wherein one end of the first electrical connector is electrically connected to the lighting lamp set, and the other end is electrically detachably connected to a solar panel; and at least a part of the first electrical connector is in sealing engagement with the housing.

The present disclosure further provides a fountain light assembly, including:

a water jetting component having a water jetting chamber, wherein one end of the water jetting component is a closed end, while the other end is an open end in communication with the water jetting chamber; the open end is configured to be detachably connected to and communicate with a water supply component; at least one water jetting hole is defined in a side wall of the water jetting chamber, and each of the at least one water jetting hole communicates the water jetting chamber with an exterior of the water jetting component; and a lamp assembly, including a housing, a lighting lamp set sealed within the housing, and a first electrical connector; a light-transmitting area is provided on the housing corresponding to a position of the lighting lamp set to allow light emitted from the lighting lamp set to pass through the light-transmitting area, and the lamp assembly is detachably connected to the water jetting component; the light-transmitting area is arranged adjacent to the water jetting hole;

wherein one end of the first electrical connector is electrically connected to the lighting lamp set, and the other end of the first electrical connector is configured to be detachably connected to the solar panel, and at least a part of the first electrical connector is sealing engagement with the housing.

The present disclosure further provides a swimming pool system, including the above solar-powered pool fountain light, wherein the solar-powered pool fountain light is mounted at an edge of the swimming pool.

In the present disclosure, the water jetting component and the water supply component are detachably connected, the lamp assembly and the solar panel are electrically detachably connected, such that the fountain light assembly is independent from the water supply component and the solar module, allowing for convenient assembly, disassembly, and maintenance of the fountain light assembly. Meanwhile, the lamp assembly and the water jetting component are detachably connected, thus, the fountain light assembly can function both as a lighting device and a fountain, with the lamp assembly and the water jetting component being independent of each other. Compared to the technical solution where the fountain light assembly and the water jetting component are integrally configured, such a separate configuration allows for separate processing without requiring a specific sequence of processes, thereby improving production efficiency. Additionally, configuring the fountain light assembly as an independent structure allows both structures of the fountain light assembly and the water jetting component to be relatively simple (compared to the integral configuration), reducing the difficulty of processing and facilitating the reduction of production technical difficulties and the improvement of production efficiency. Furthermore, in future maintenance, only the damaged lamp assembly or water jetting component needs to be replaced, without the need for overall replacement, which reduces maintenance costs. In addition, the adjacent arrangement of the light-transmitting area and the water jetting hole enables the water jet ejected from the water jetting hole to be illuminated, allowing users to not only use the swimming pool conveniently at night but also enjoy the beautiful fountain.

BRIEF DESCRIPTION OF THE DRAWINGS

To more clearly illustrate the technical solutions in the embodiments of the present disclosure or the prior art, the accompanying drawings required for the description of the embodiments or the prior art will be briefly introduced below. It is evident that the accompanying drawings described below are merely some embodiments of the present disclosure. For those skilled in the art, other drawings can be obtained based on the structures shown in these accompanying drawings without creative effort. In the drawings.

The realization of the purpose, functional features, and advantages of this application will be further explained with reference to the accompanying drawings in conjunction with the embodiments.

DETAILED DESCRIPTION OF THE EMBODIMENTS

To make the objectives, technical solutions, and advantages of the embodiments of the present disclosure clearer, the technical solutions in the embodiments of the present disclosure will be described clearly and comprehensively below in conjunction with the accompanying drawings. Obviously, the described embodiments are only a part of the embodiments of the present disclosure, not all of them. Based on the embodiments of the present disclosure, all other embodiments obtained by those of ordinary skill in the art without creative effort fall within the scope of protection of the present disclosure.

It should be noted that all directional indications (such as up, down, left, right, front, and back) in the embodiments of the present disclosure are only used to explain the relative positional relationships and motion conditions between various components in a specific posture (as shown in the accompanying drawings). If the specific posture changes, the directional indications will also change accordingly.

In addition, the descriptions involving "first", "second", etc. in the present disclosure are only used for descriptive purposes and cannot be understood as indicating or implying their relative importance or implicitly specifying the number of technical features indicated. Therefore, features defined as "first" or "second" may explicitly or implicitly include at least one such feature. Furthermore, "and/or" throughout the text includes three options, taking A and/or B as an example, including the technical solution of A, the technical solution of B, and the technical solution where both A and B are satisfied simultaneously. Additionally, technical solutions between various embodiments can be combined with each other, but this must be based on what ordinary technical personnel in the field can achieve. When the combination of technical solutions is contradictory or unachievable, it should be considered that such combination of technical solutions does not exist and is not within the scope of protection claimed in the present disclosure.

The present disclosure primarily provides a solar-powered pool fountain light, which is primarily used in a pool system to provide illumination, enabling a swimming pool to be used normally even at night, thereby increasing the utilization rate of the swimming pool. A solar-powered pool system refers to a pool system that includes the swimming pool, a pool purification system, pool accessories, and the solar-powered pool fountain light.

The following will primarily describe the specific structure of the solar-powered pool fountain light.

Figure 1:
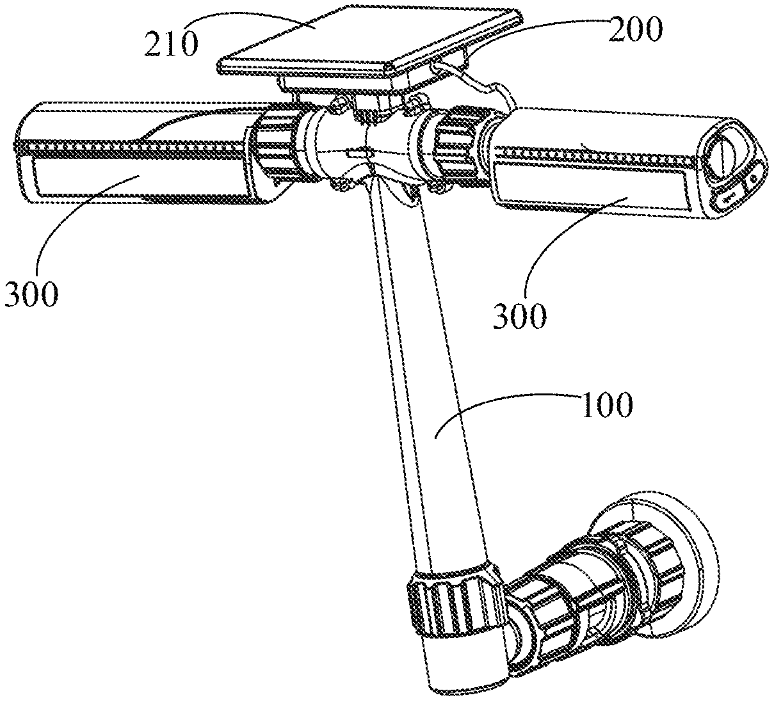
FIG. 1 is a schematic view of a solar-powered pool fountain light in accordance with an embodiment of the present disclosure.
Figure 2:
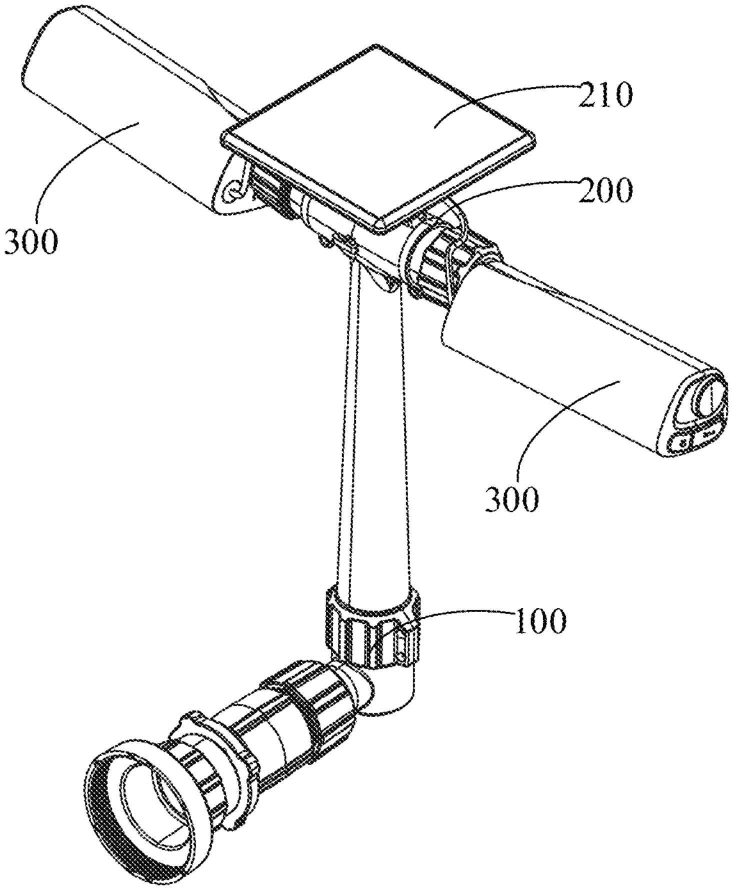
FIG. 2 is a schematic view of FIG. 1, viewed from another angle.
Figure 3:
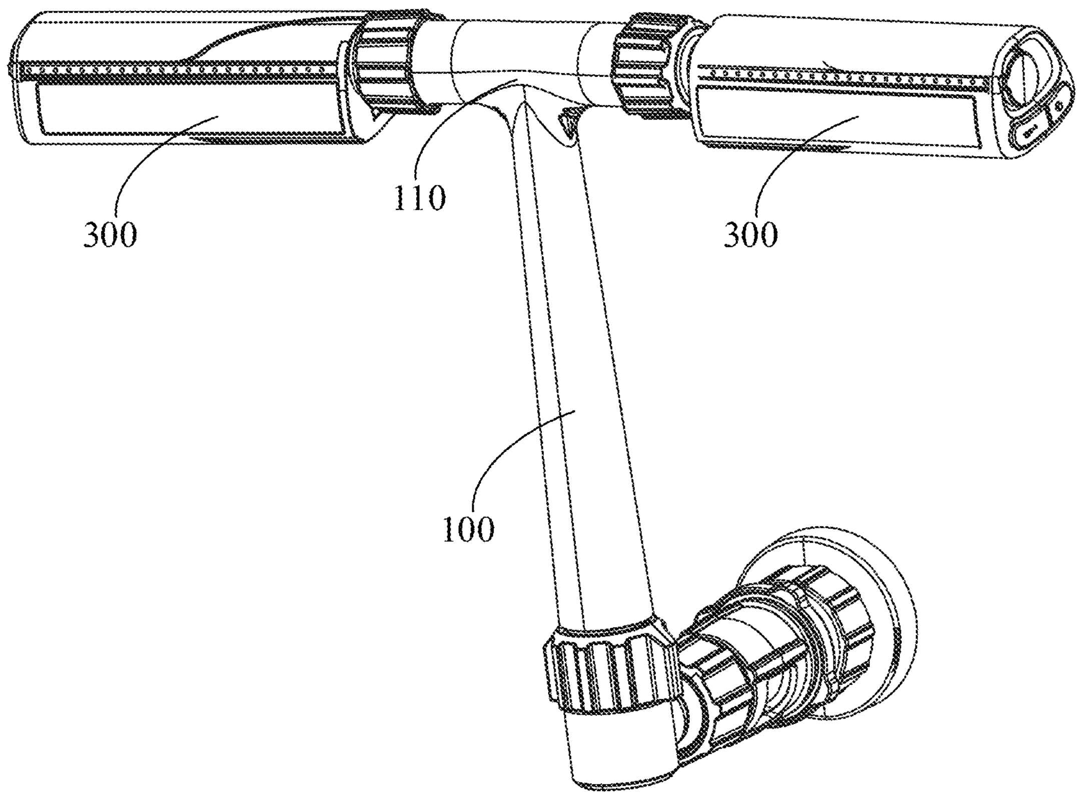
FIG. 3 is a schematic view showing that a water supply component and a fountain light assembly of the solar-powered pool fountain light are assembled together.
Figure 4:
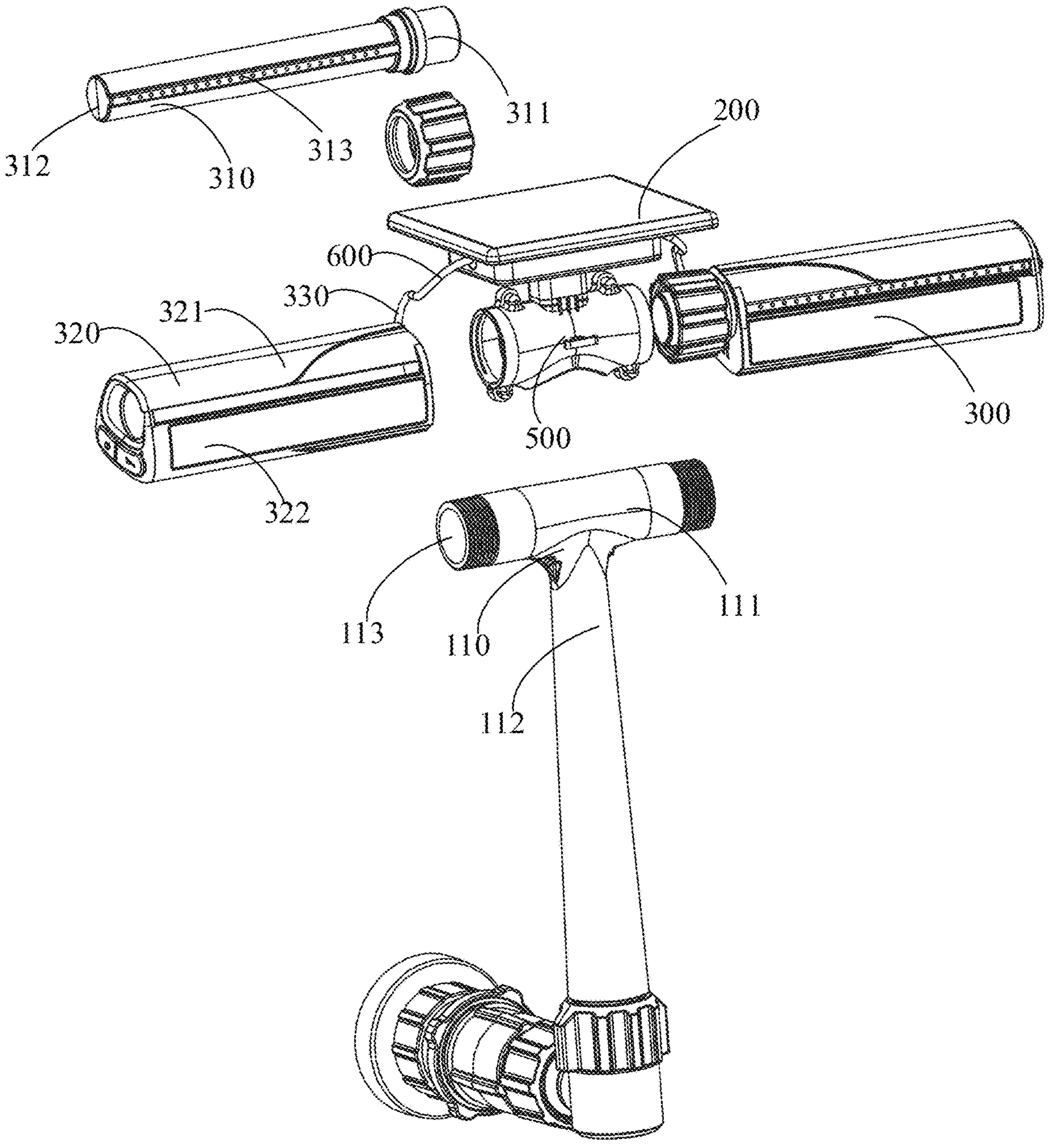
FIG. 4 is an exploded schematic view of a solar-powered pool fountain light in accordance with an embodiment of the present disclosure.
Figure 5:
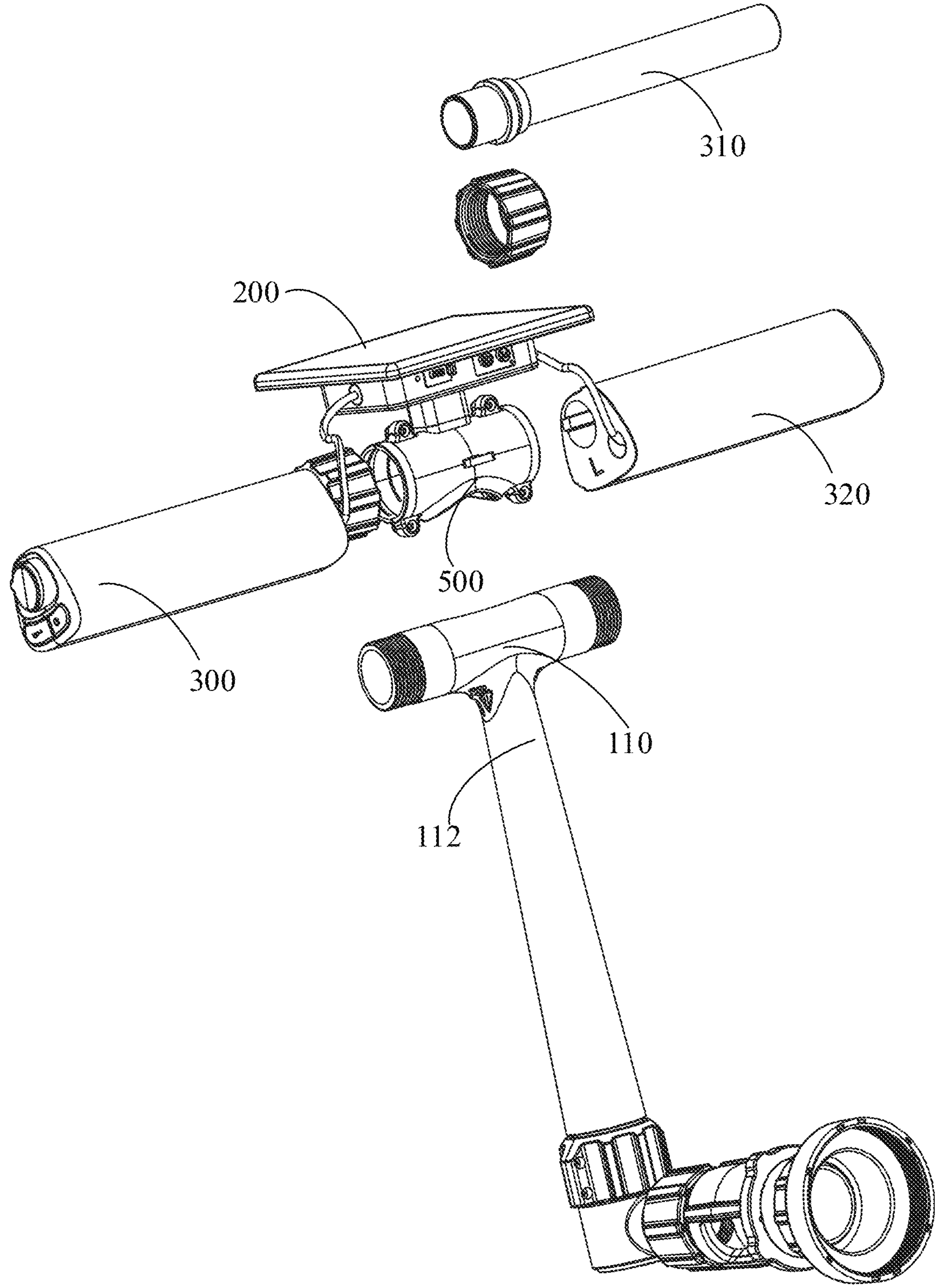
FIG. 5 is a schematic view of FIG. 4, viewed from another angle.
Figure 6:
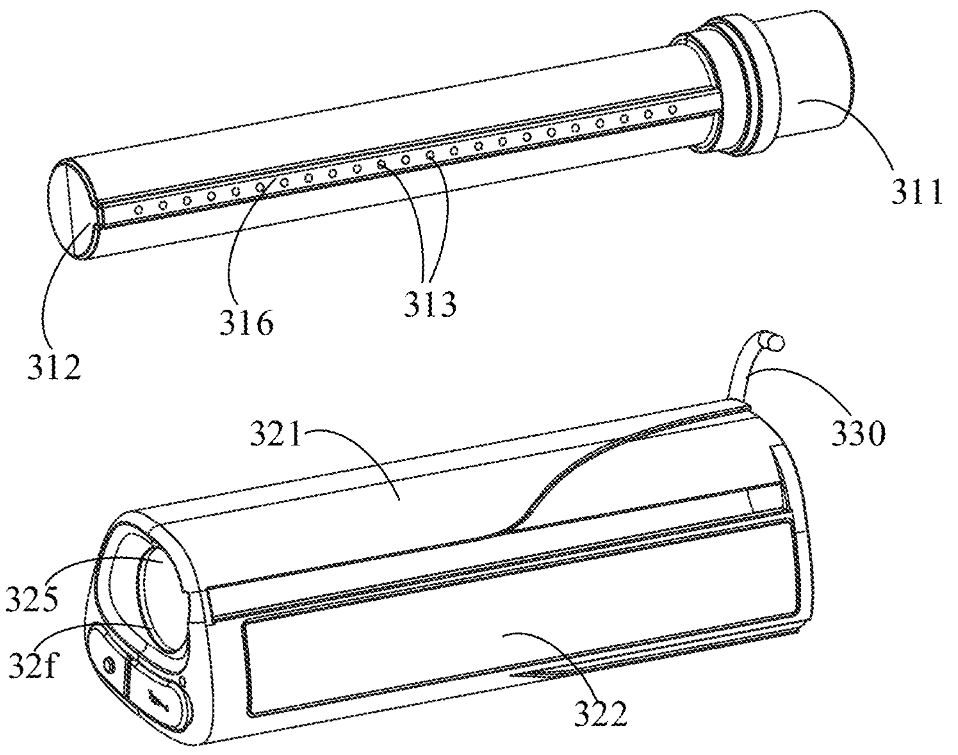
FIG. 6 is an exploded schematic view of the fountain light assembly in accordance with an embodiment of the present disclosure.
Figure 7:
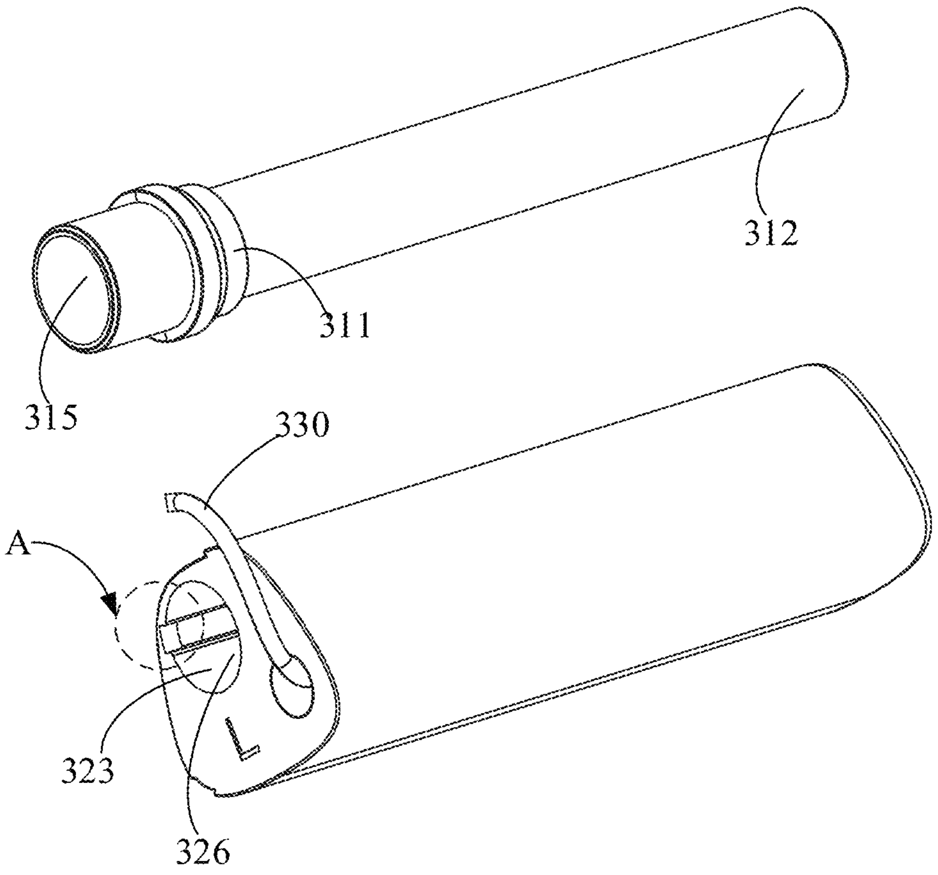
FIG. 7 is a schematic view of FIG. 6, viewed from another angle.
Figure 8:
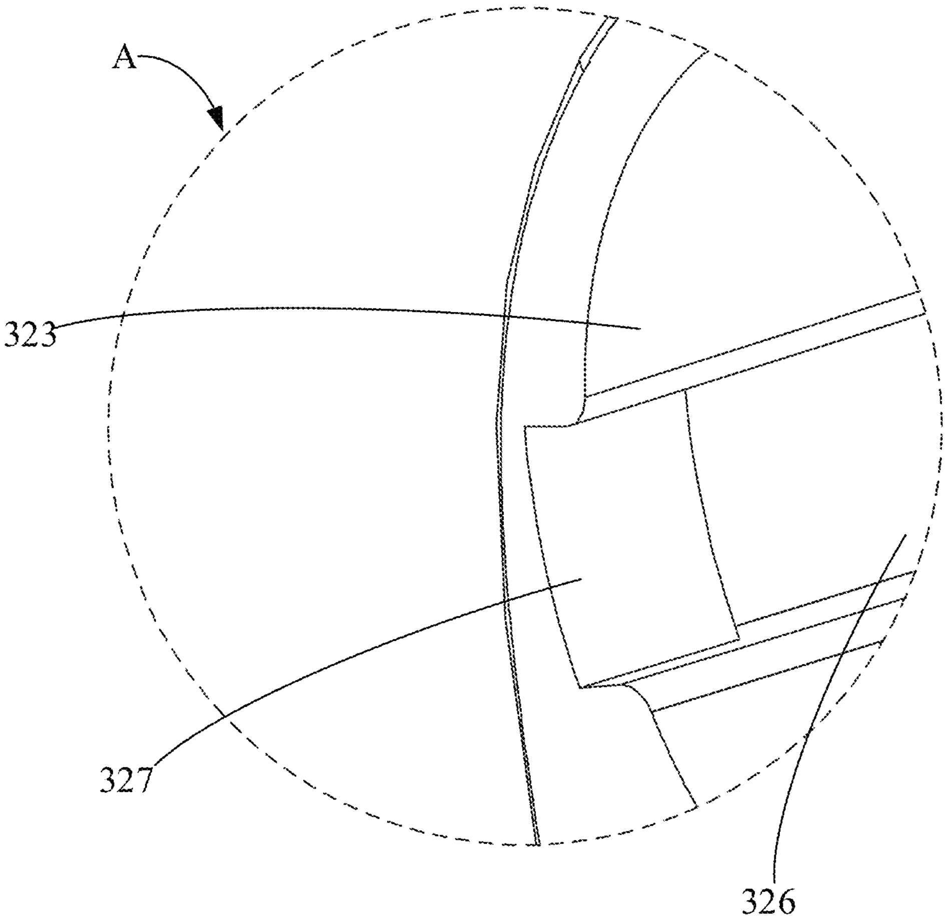
FIG. 8 is a partially enlarged view of a point A in FIG. 7.
Figure 9:
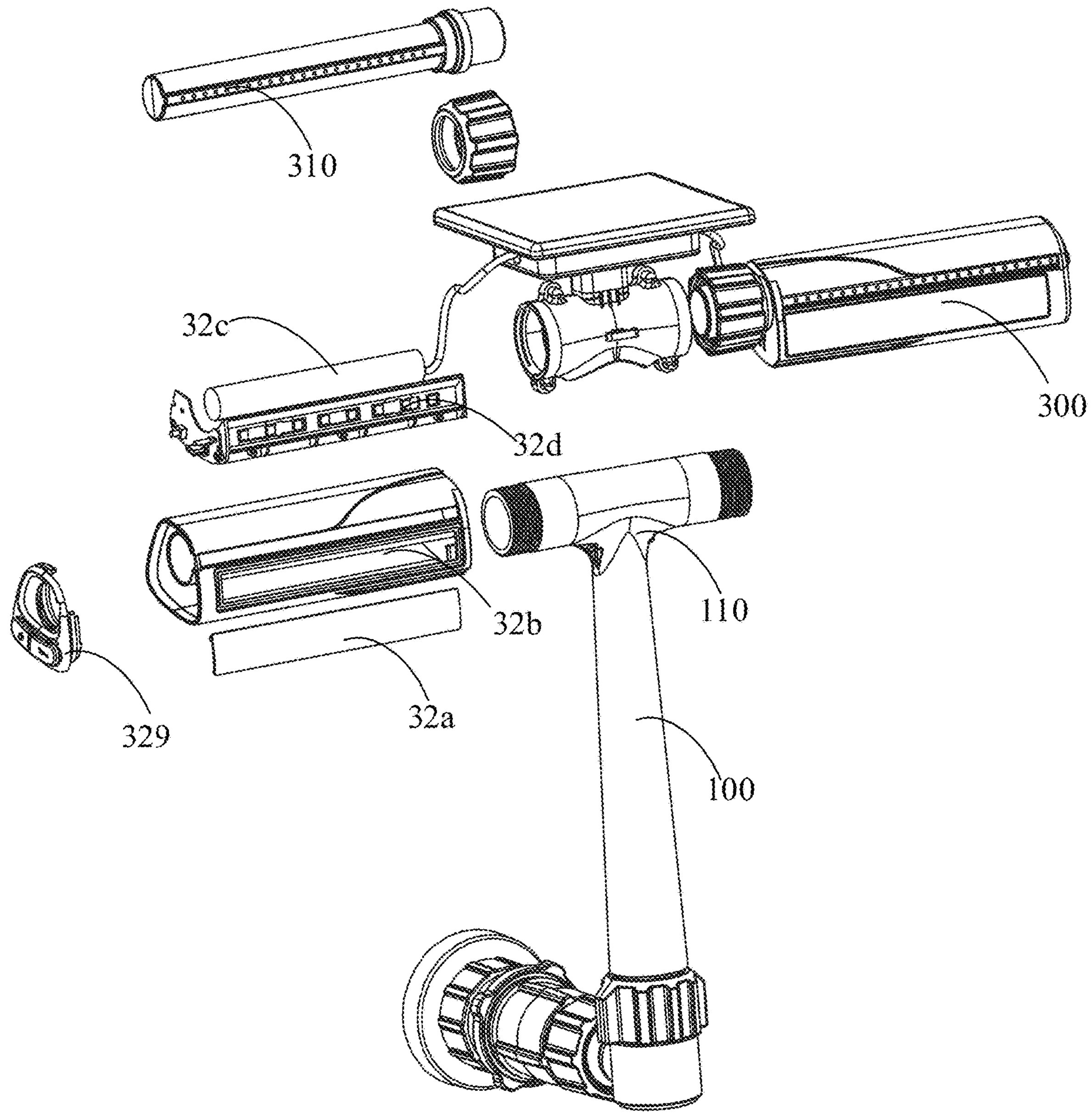
FIG. 9 is an exploded schematic view of a solar-powered pool fountain light in accordance with another embodiment of the present disclosure.
Figure 10:
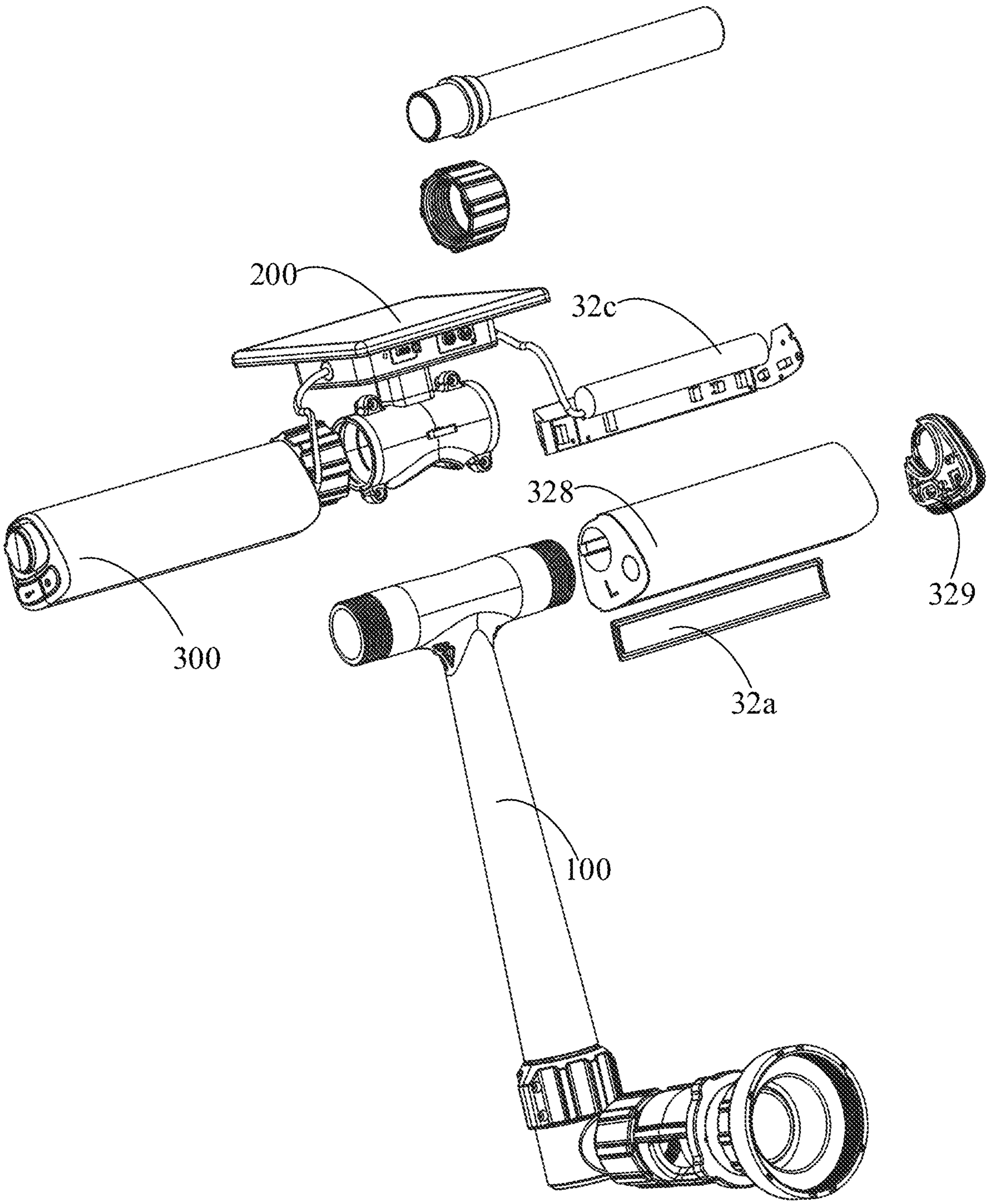
FIG. 10 is a schematic view of FIG. 9, viewed from another angle.
Figure 11:
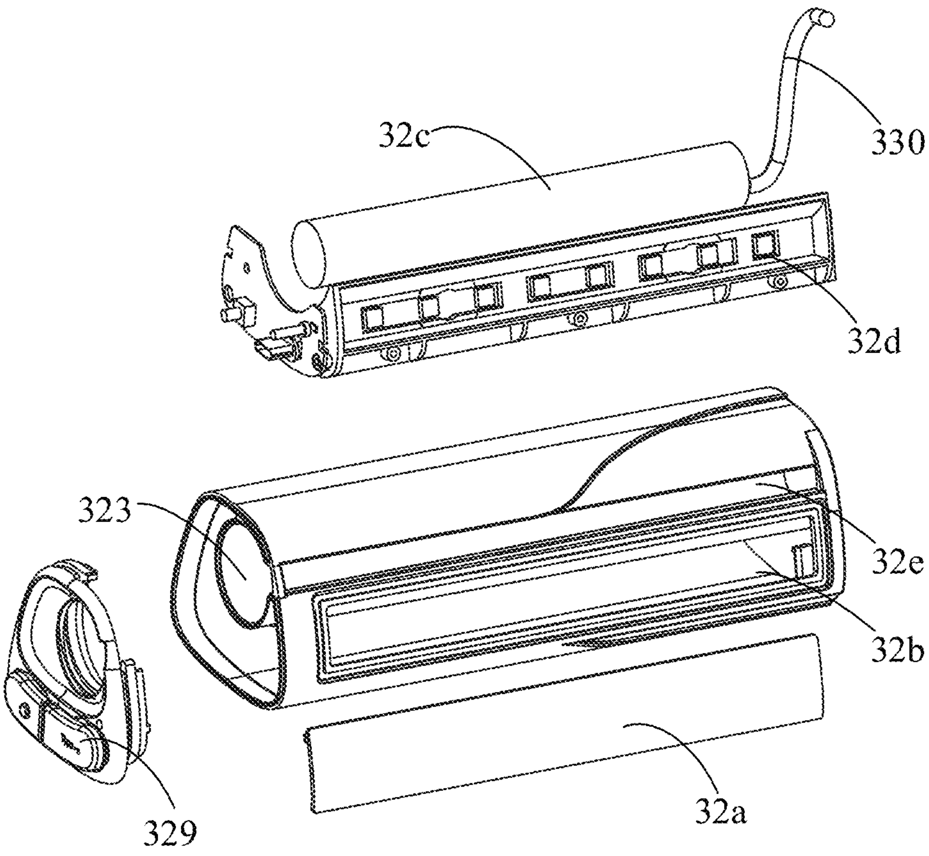
FIG. 11 is an exploded schematic view of a lamp assembly in accordance with an embodiment of the present disclosure.
Figure 12:
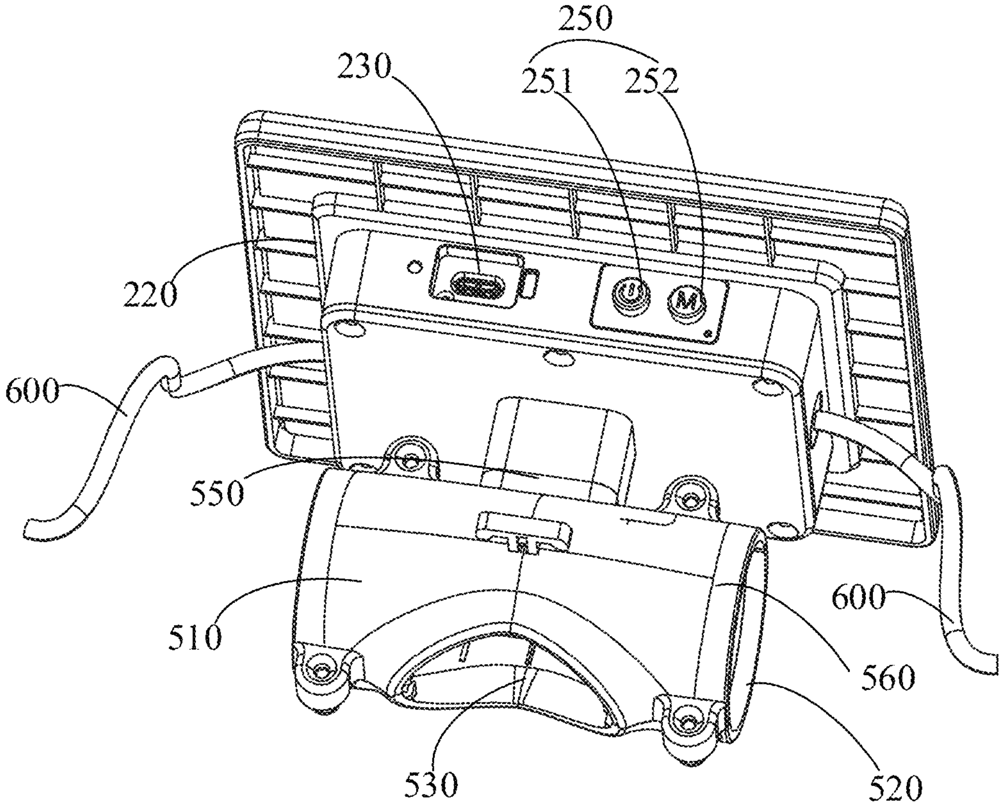
FIG. 12 is a schematic view showing that the solar module and a mounting assembly are assembled together.

Referring to FIGS. 1 to 12, in the embodiment of the present disclosure, the solar-powered pool fountain light includes a water supply component 100, a solar panel 210, and at least one fountain light assembly 300.

The water supply component 100 has a water supply channel. One end of the water supply channel is configured to communicate with the swimming pool, while the other end of the water supply channel extends along a length of the water supply component 100 to be above a water surface of the swimming pool.

The solar panel 210 is mounted on the water supply component 100, and the solar panel 210 is exposed above the water surface of the swimming pool.

The fountain light assembly 300 includes a water jetting component 310 and a lamp assembly 320.

The water jetting component 310 is detachably connected to the water supply component 100. The water jetting component 310 has a water jetting chamber 315. At least one jetting hole 313 is defined in a side wall of the water jetting chamber 315, communicating the water jetting chamber 315 with an exterior of the water jetting component 310. One end of the water jetting component 310 is a closed end 312, while the other end thereof is an open end 311 which is in communication with the water jetting chamber 315. The open end 311 is configured to communicate with the end of the water supply channel that is exposed above the water surface.

The lamp assembly 320 includes a housing 321, a lighting lamp set **32*d* sealed within the housing 321, and a first electrical connector 330. A light-transmitting area 322 is provided on the housing 321 at a position corresponding to the lighting lamp set 32*d*, allowing light emitted from the lighting lamp set 32*d* to pass through the light-transmitting area 322. The lamp assembly 320 is detachably connected to the water jetting component 310. The light-transmitting area 322 is arranged adjacent to the water jetting hole 313**.

One end of the first electrical connector 330 is electrically connected to the lighting lamp set 32*d*, and the other end of the electrical connector 330 is configured to be electrically connected to the solar panel 210. At least a part of the first electrical connector 330 is in sealing engagement with the housing 321.

In this embodiment, the water supply component 100 can take many forms, such as being tubular, with the water supply channel being an internal space of the tubular body. One end of the water supply component 100 is configured to extend into an interior of the swimming pool, while the other end thereof extends out of the water surface of the swimming pool. The end of the water supply component 100 located inside the swimming pool can be connected to a water pump, which delivers the water in the swimming pool to flow along the water supply channel. The end of the water supply component 100 extending out of the water surface can have one or more water outlets. When there is one water outlet, one fountain light assembly 300 can be provided; when there are multiple water outlets, multiple fountain light assemblies 300 can be provided, such that each fountain light assembly 300 can be connected to the water supply component 100. The end of the water supply component 100 extending out of the water surface further has a mounting structure for mounting the solar module 200.

The solar module 200 includes a mounting bracket 220 and a solar panel 210. The solar panel 210 is mounted on the mounting bracket 220, and the mounting bracket 220 is configured to be connected to the water supply component 100. The mounting bracket 220 can be connected to the water supply component 100 in various ways, such as fixed connection or detachable connection (e.g., through magnetic adsorption, screw fasteners, buckle connection, etc.). In this embodiment, taking the insertion connection as an example, one of the mounting bracket 220 and the water supply component 100 is provided with an insertion hole, while the other of the mounting bracket 220 and the water supply component 100 is provided with an insertion protrusion. For example, an insertion hole is defined in a side of the mounting bracket 220 facing away from the solar panel 210, and an insertion protrusion is arranged on the water supply component 100. By detachably connecting the mounting bracket 220 and the water supply component 100, the solar module 200 can be easily mounted to and detached from the water supply component 100. This also allows the mounting bracket 220 and the water supply component 100 to be produced and manufactured separately, improving the respective production efficiency.

Under normal circumstances, the fountain light assembly 300 is exposed above the water surface of the swimming pool during use. However, in some embodiments, a part or all of the fountain light assembly 300 can be located below the water surface of the swimming pool. In this case, water is ejected from the water jetting holes 313 above the water surface and then falls back into the swimming pool.

An overall shape of the water jetting component 310 can vary, such as being elongated, square, round, and oval, which is not specifically limited herein. Taking the elongated shape as an example, one end of the elongated water jetting component 310 is open, while the other end thereof is closed. At least some of the water jetting holes 313 are arranged at intervals between the open end 311 and the closed end 312. When the water jetting component 310 is in other polygonal shapes, the number of the open ends 311 and the closed ends 312 can be multiple. The closed end 312 can be self-enclosed (the closed end is integrally formed with the water jetting component 310) or can be sealed through subsequent machining. Water from the swimming pool enters the water jetting chamber 315 through the open end 311, and due to the closed end 312, the water cannot be discharged. Under water pressure, the water is ejected through the water jetting holes 313. The number of the water jetting holes 313 can be one or multiple. In this embodiment, the number of the water jetting holes 313 is multiple, and the multiple water jetting holes 313 are arranged at intervals along a length direction of the water jetting component 310.

A shape of the housing 321 can vary, such as being elongated, square, and circular, which is not specifically limited herein. In this embodiment, taking the elongated cylindrical shape as an example, a cross-section of the housing 321 can be roughly circular, elliptical, trapezoidal, etc. A structural form of the housing 321 can vary widely. In an embodiment, the housing 321 includes a housing body 328 and an end cover 329. One end of the housing body 328 is open, allowing the lighting lamp set 32*d* to be mounted into the housing 321 through the opening. The end cover 329 seals the open end of the housing body 328, such that the housing 321 becomes a sealed structure.

In some embodiments, the housing body 328 can be integrally formed. In this case, the housing body 328 can be made of a light-transmitting material, allowing the light emitted by the lighting lamp set 32*d* to pass through the housing body 328. Any area of the housing body 328 can be the light-transmitting area 322.

In other embodiments, the housing body 328 includes a base housing and a light-transmitting cover 32*a*. The base housing can be made of opaque material, while the light-transmitting cover 32*a* is made of light-transmitting material. A light outlet 32*b* corresponding to the lighting lamp set 32*d*, such that the light emitted by the lighting lamp set 32*d* can pass through the light outlet 32*b*. The light-transmitting cover 32*a* is configured to cover the light outlet 32*b*, which not only prevents water, mosquitoes, dust, etc. in the external environment from entering the housing 321, but also allows the light emitted by the lighting lamp set 32*d* to pass through the light-transmitting cover 32*a*. In this case, the area corresponding to the light outlet 32*b* and the light-transmitting cover 32*a* is the light-transmitting area 322.

It is noted that in some embodiments, the opening for mounting the lighting lamp set 32*d* may not be provided at the end of the housing 321, or there is no need to provide an opening at the end of housing 321. Instead, the lighting lamp set 32*d* can be mounted into the housing 321 from the light outlet 32*b*. That is, in this case, the end cover 329 is not required, and only the light-transmitting cover 32*a* is required. In an embodiment, the lighting lamp set 32*d* can be first mounted into the housing 321 through the light outlet 32*b*, and then the light outlet 32*b* is covered by the light-transmitting cover 32*a*.

The first electrical connector 330 can be a rigid electrical connector like an electrical terminal or a flexible electrical connector, such as a wire (with an end having an electrical port) and a flexible circuit board. One end of the first electrical connector 330 is electrically connected to the lighting lamp set 32*d*, and the other end thereof extends out of the housing 321 to be detachably connected to the solar panel. There are many positions where the first electrical connector 330 can extend out of the housing 321; for example, the first electrical connector 330 can extend out of the housing 321 from one end of the housing 321. In this case, the first electrical connector 330 can extend out of the housing 321 from the end of the housing 321 with the end cover 329, or from the end of the housing 321 close to the open end 311 of the water jetting component 310. In an embodiment, the first electrical connector 330 extends out of the housing 321 from the end of the housing 321 close to the open end 311 of the water jetting component 310, which can accommodate both the detachable connection between the water jetting component 310 and the water supply component 100, as well as the detachable connection between the first electrical connector 330 and the solar panel 210. Such a configuration significantly reduces an electrical connection distance between the first electrical connector 330 and the solar panel 210, simplifying the complexity of the connection and allowing the overall structure to be more concise.

In some embodiments, the lighting lamp set **32*d* includes a lamp board extending along a length direction of the housing 321, with several lighting lamp beads arranged on the lamp board. The lamp board is arranged at intervals along a length direction of the light-transmitting area 322, and the light-transmitting area 322 extends along the length direction of the housing 321 corresponding to the lamp board, such that light can be emitted uniformly from the light-transmitting area 322. In some embodiments, the lighting lamp set 32*d* includes the lamp board and a battery 32*c* which are arranged in parallel with each other within the housing 321 and both extend along the length direction of the housing 321. In this way, the internal space of the housing 321** can be fully utilized, improving space utilization efficiency and also facilitating light emission.

The lamp assembly 320 can be detachably connected to the water jetting component 310 in many ways. For example, the lamp assembly 320 can be connected to the water jetting component 310 via a buckle, a snap connection, a plug connection, or a magnetic piece adsorption connection. In some embodiments, the lamp assembly 320 is provided with a first magnetic member, and the water jetting component 310 is provided with a second magnetic member. The two magnetic members are magnetically adsorbed to each other. In an embodiment, the first magnetic member is arranged along the length direction of the housing 321, and the second magnetic member is arranged along the length direction of the water jetting component 310. When the first and second magnetic members are magnetically adsorbed, the lamp assembly 320 and the water jetting component 310 can be stacked and adsorbed together, increasing the area of magnetic adsorption therebetween and improving the stability after magnetic connection.

In this embodiment, the water jetting component 310 and the water supply component 100 are detachably connected, the lamp assembly 320 and the solar panel 210 are electrically detachably connected, such that the fountain light assembly 300 is independent from the water supply component 100 and the solar module 200, allowing for convenient assembly, disassembly, and maintenance of the fountain light assembly 310. Meanwhile, the lamp assembly 320 and the water jetting component 100 are detachably connected, thus, the fountain light assembly 300 can function both as a lighting device and a fountain, with the lamp assembly 320 and the water jetting component 310 being independent of each other. Compared to the technical solution where the fountain light assembly and the water jetting component are integrally configured, such a separate configuration allows for separate processing without requiring a specific sequence of processes, thereby improving production efficiency. Additionally, configuring the fountain light assembly 300 as an independent structure allows both structures of the fountain light assembly 300 and the water jetting component 310 to be relatively simple (compared to the integral configuration), reducing the difficulty of processing and facilitating the reduction of production technical difficulties and the improvement of production efficiency. Furthermore, in future maintenance, only the damaged lamp assembly or water jetting component needs to be replaced, without the need for overall replacement, which reduces maintenance costs. Moreover, the adjacent arrangement of the light-transmitting area 32 and the water jetting hole 313 enables the water jet ejected from the water jetting hole 313 to be illuminated, allowing users to not only use the swimming pool conveniently at night but also enjoy the beautiful fountain.

In some embodiments, in order to make rational use of space, improve space utilization, and enhance the structure compactness and stability of the fountain light assembly 300, one of the water jetting component 310 and the housing 321 has an assembly cavity 326 and an assembly opening 323 communicating with the assembly cavity 326, and the other can be detachably inserted into the assembly cavity 326 through the assembly opening 323. After the water jetting component 310 and the housing 321 are assembled together, the water jetting hole 313 is exposed.

In this embodiment, when the water jetting component 310 has the assembly cavity 326, the housing 321 of the lamp assembly 320 is inserted into the assembly cavity 326 through the assembly opening 323. Furthermore, an outer side wall of the housing 321 is clamped tightly to an inner side wall of the assembly cavity 326. There are many ways to achieve this clamping, for example, the outer side wall of the housing 321 can be clamped tightly to the inner side wall of the assembly cavity 326 by setting matching dimensions (where a radial dimension of a part of the housing 321 is substantially equivalent to an internal dimension of the assembly cavity 326, resulting in a tight engagement after the housing 321 is inserted into the assembly cavity 326). Alternatively, a clamping structure can be provided on the inner side wall of the assembly cavity 326 and/or the_outer side wall of the housing 321.

When the housing 321 of the lamp assembly 320 has the assembly cavity 326, the water jetting component 310 is inserted into the assembly cavity 326 through the assembly opening 323. Furthermore, an outer side wall of the water jetting component 310 is clamped tightly to an inner side wall of the assembly cavity 326. There are various ways to achieve this clamping, for example, the outer side wall of the water jetting component 310 can be clamped tightly to the inner side wall of the assembly cavity 326 (where a radial dimension of a part of the water jetting component 310 is substantially equivalent to an internal dimension of the assembly cavity 326, resulting in a tight engagement after the water jetting component 310 is inserted into the assembly cavity 326). Alternatively, a clamping structure can be provided on the inner side wall of the assembly cavity 326 and/or the outer side wall of the water jetting component 310.

In the above embodiment, the overall shape of the housing 321 and the water jetting component 310 are not specifically limited herein, as long as the housing 321 and the water jetting component 310 can be inserted into each other. By inserting one of the water jetting component 310 and the housing 321 into the other, the spaces of the water jetting component 310 and the housing 321 at least partially overlap with each other, improving space utilization. In addition, the insertion assembly method greatly simplifies the engagement process and improves the engagement stability.

Two different types of insertion methods are respectively explained as follows.

In some embodiments, the assembly cavity 326 extends along the length direction of the water jetting component 310. The assembly cavity 326 and the water jetting chamber 315 are independently arranged, and the assembly opening 323 is located at the end of the water jetting component 310. The housing 321 is inserted into the assembly cavity 326 through the assembly opening 323 and arranged in parallel with the water jetting component 310.

In this embodiment, both the water jetting component 310 and the housing 321 are cylindrical in shape. After the lamp assembly 320 is inserted into the assembly cavity 326, the water jetting component 310 is arranged in parallel with the lamp assembly 320, and most of the lamp assembly 320 is received within the assembly cavity 326. The assembly cavity 326 and the water jetting chamber 315 are arranged at intervals and in parallel, being independent of each other, ensuring that water in the water jetting chamber 315 does not enter the assembly cavity 326. The light-transmitting structure is provided on the assembly cavity 326, corresponding to the light-transmitting area 322. The light-transmitting structure can be a light-passing hole or a translucent structure. The light-transmitting structure allows light emitted from the light-transmitting area 322 to light the exterior of the water jetting component 310.

In some embodiments, the assembly cavity 326 extends along the length direction of the housing 321, and the assembly opening 323 is located at the end of the housing 321; the water jetting component 310 is inserted into the assembly cavity 326 through the assembly opening 323 and arranged in parallel with the housing 321.

In this embodiment, both the water jetting component 310 and the housing 321 are cylindrical in shape. After the water jetting component 310 is inserted into the assembly cavity 326, the water jetting component 310 is in parallel with the lamp assembly 320, and most of the water jetting component 310 is received within the assembly cavity 326, resulting in a reliable engagement between the water jetting component 310 and the assembly cavity 326. The assembly cavity 326 is spatially isolated from the space where the lamp assembly is received, preventing external water from entering the space where the lamp assembly is received.

The water jetting holes 313 can be exposed in many ways. Here is a specific example to illustrate. An avoidance opening **32*e* is formed in a side wall of the assembly cavity 326, extending along a length direction of the assembly cavity 326. The water jetting holes 313 are exposed through the avoidance opening 32*e*. The avoidance opening 32*e* can be formed in many ways; for example, the avoidance opening 32*e* can be formed circumferentially along the side wall of the assembly cavity 326 or formed obliquely to the length direction of the housing 321. In this embodiment, the avoidance opening 32*e* is formed along the length direction of the housing 321. In this way, the multiple water jetting holes 313 are arranged at intervals along a length direction of the avoidance opening 32*e*. Such a configuration allows the water jetting holes 313, which are arranged along the length direction of the water jetting component 310, to be exposed through the avoidance opening 32*e*. When the water jetting holes 313** emit water jets simultaneously from the same height, a curtain-like water screen is formed, which improves the ornamental value of the fountain.

In some embodiments, to improve the assembly stability between the water jetting component 310 and the housing 321, an insertion groove 327 is formed in the inner side wall of the assembly cavity 326, extending along the length direction of the assembly cavity 326 to the assembly opening 323. An assembly protrusion 316 is arranged on the outer side wall of the water jetting component 310 for being inserted into the insertion groove 327.

There can be various forms of the assembly protrusion 316. For example, the assembly protrusion 316 can extend along the circumferential direction of the water jetting component 310, or along a direction inclined to the length of the water jetting component 310. In this embodiment, the assembly protrusion 316 extends along the length direction of the water jetting component 310. Since the insertion groove 327 extends to the assembly opening 323, the assembly protrusion 316 can be inserted from an end of the insertion groove 327.

The assembly protrusion 316 protrudes from the outer side wall of the water jetting component 310. When the assembly protrusion 316 is inserted into the insertion groove 327 from the end of the insertion groove 327, a side wall of the insertion groove 327 abuts a side wall of the assembly protrusion 316, which prevents the water jetting component 310 from rotating within the assembly cavity 326. This stabilizes the relative position of the water jetting hole 313 and the light-transmitting area 322 and ensures that the water jet ejected from the water jetting hole 313 can be illuminated by the light emitted from the light-transmitting area 322. Such configuration greatly improves the assembly stability of the lamp assembly 320 and the water jetting component 310, while also ensuring that the light emitted by the lamp assembly 320 can illuminate the fountain emitted from the fountain light assembly.

In some embodiments, the avoidance opening **32*e* is formed in the side wall of the assembly cavity 326, extending along the length direction of the assembly cavity 326; the insertion groove 327 is arranged correspondingly to the avoidance opening 32*e*, and the water jetting hole 313 penetrates through the side wall of the water jetting chamber 315 and the assembly protrusion 316, such that the water jetting hole 313 is exposed on the outer surface of the assembly protrusion 316; and a portion of the assembly protrusion 316 with the water jetting hole 313 is exposed through the avoidance opening 32*e*. Such configuration further enhances the structural compactness and stability of the fountain light assembly 300**.

The avoidance opening **32*e* occupies a portion of the side wall of the assembly cavity 326 in the length direction of the assembly cavity 326, and the insertion groove 327 is formed in the remaining portion of the side wall. In other words, the insertion groove 327 is provided on the side wall of the assembly cavity 326 at both ends of the avoidance opening 32*e*. Meanwhile, the water jetting hole 313 is arranged corresponding to the assembly protrusion 316, such that the water jetting hole 313 communicates with the water jetting chamber 315 and the outer surface of the assembly protrusion 316, thereby increasing a depth of the water jetting hole 313. By increasing the depth of the water jetting hole 313, the flow time in the water jetting hole 313 can be increased, such that the water can be better shaped in the water jetting hole 313. As a result, the water jet ejected from the water jetting hole 313** is more complete and the jetting distance is also increased.

By arranging the insertion groove 327 at both ends of the avoidance opening **32*e*, with the length directions of the insertion groove 327 and the avoidance opening 32*e* being aligned with each other, and simultaneously positioning the water jetting hole 313 at the position with the assembly protrusion 316, the structure of the assembled fountain light assembly 300 becomes more compact. Additionally, since both the avoidance opening 32*e* and the light-transmitting area 322** are located on the same component (the housing 321 of the lamp assembly 320), the positional accuracy of the avoidance opening 32*e* and the light-transmitting area 322 can be effectively ensured during processing. During assembly, the engagement between the assembly protrusion 316 and the insertion groove 327 ensures the positional accuracy of the water jetting hole 313 and the light-transmitting area 322, thereby ensuring that the water jet ejected from the water jetting hole 313 can be illuminated by the light emitted from the light-transmitting area 322.

In some embodiments, to facilitate the disassembly of the water jetting component 310 and the lamp assembly 320, the end of the housing 321 away from the assembly opening 323 is formed with a disassembly port 325 which communicates with the assembly cavity 326. When the water jetting component 310 is inserted into the assembly cavity 326, the closed end 312 is exposed through the disassembly port 325.

In this embodiment, after the water jetting component 310 is inserted into the assembly cavity 326, the closed end 312 of the water jetting component 310 can extend out of assembly cavity 326 through the disassembly port 325. When the disassembly of the water jetting component 310 is required, the user can directly act on the exposed or extended water jetting component 310 with their hands, thereby removing the water jetting component 310 from the assembly cavity 326 more easily.

In some embodiments, at least a part of the insertion groove 327 is formed in an end wall of the avoidance opening 32*e* close to the assembly opening 323, and/or on the end wall of the avoidance opening 32*e* close to the disassembly port 325. This allows the insertion groove 327 to connect the assembly opening 323 and the avoidance opening 32*e*, and/or connect the disassembly port 325 and the avoidance opening 32*e*. In this embodiment, the insertion groove 327 is divided into two sections, which respectively communicate with the assembly opening 323 and the avoidance opening 32*e*, as well as communicate with the disassembly port 325 and the avoidance opening 32*e*. Such a configuration enables the assembly protrusion 316 to smoothly pass through the insertion groove 327 (the part close to the assembly opening 323), the avoidance opening 32*e*, and the insertion groove 327 (the part close to the disassembly port 325) in sequence.

In some embodiments, to create lighting fountains with different effects, at least two of the avoidance openings 32*e* are provided. The avoidance openings 32*e* and the light-transmitting area 322 are arranged at intervals along the circumferential direction of the housing 321. The water jetting hole 313 can be selectively exposed through any one of the avoidance openings 32*e*.

In this embodiment, the number of the avoidance openings 32*e* can vary, such as two and three. Taking two avoidance openings 32*e* as an example, the two avoidance openings 32*e* are arranged at intervals along the circumferential direction of the housing 321, resulting in different distances between each avoidance opening 32*e* and the light-transmitting area 322. When the water jetting holes 313 are respectively exposed through different avoidance openings 32*e*, the distance between the corresponding water jetting hole 313 and the light-transmitting area 322 is different. When the water jets emitted from the water jetting holes 313 at different positions pass through the light-transmitting area 322, the light emitted from the light-transmitting area 322 projects onto the water jet to produce different effects. This allows users to adjust and achieve different effects according to their preferences and needs.

In some embodiments, to ensure the lighting effect of the fountain, both the avoidance opening 32*e* and the light-transmitting area 322 extend along the length direction of the housing 321; and the avoidance opening 32*e* and the light-transmitting area 322 are arranged adjacent to each other in the circumferential direction of the housing 321; and/or, the housing 321 has an inclined side surface, and the avoidance opening 32*e* and the light-transmitting area 322 are located on the inclined side surface.

In this embodiment, by arranging both the avoidance opening 32*e* and the light-transmitting area 322 to extend along the length direction of the housing 321 and being adjacent to each other in the exposed circumferential direction of the housing 321, a row of water jets from the avoidance openings 32*e* can be illuminated by light emitted from the light-transmitting area 322, stably achieving a good fountain lighting effect.

In some embodiments, the avoidance opening 32*e* and the light-transmitting area 322 can be located on the same inclined side surface of the housing 321. During operation, the avoidance opening 32*e* is positioned above and behind the light-transmitting area 322, ensuring that the parabolic shape of the water jet from the avoidance opening 32*e* is clearly visible within the lighting range of the light emitted from the light-transmitting area 322. This arrangement facilitates users in better enjoying the fountain.

In some embodiments, to enhance the assembly reliability of the water jetting component 310 and the lamp assembly 320, a clamping protrusion 32*f* is arranged on the inner groove wall of the assembly cavity 326 to tightly clamp the outer side wall of the water jetting component 310.

In this embodiment, the forms of the clamping protrusions 32*f* can vary, such as being protruding bumps and protruding ridges. The number of the protruding bumps and the protruding ridges can be multiple, and the multiple protruding bumps and protruding ridges can be arranged along the length direction of the assembly cavity 326 or along the circumferential direction of the assembly cavity 326, which is not specifically limited herein. In this embodiment, the clamping protrusion 32*f* can be a protruding ridge extending along the circumferential direction of the assembly cavity 326.

In some embodiments, to enhance the convenience of inserting and removing the water jetting component 310 into and from the assembly cavity 326, the clamping protrusion 32*f* is positioned close to the end of the assembly cavity 326 away from the assembly opening 323. The clamping protrusion 32*f* is arranged in an arc-shaped strip and extends along the circumference of the inner side wall of the assembly cavity 326. In this embodiment, by positioning the clamping protrusion 32*f* at the end of the assembly cavity 326 away from the assembly opening 323, the water jetting component 310 does not contact the clamping protrusion 32*f* when initially entering the assembly cavity 326. This minimizes the friction between the water jetting component 310 and the inner side wall of the assembly cavity 326, facilitating smooth movement of the water jetting component 310 within the assembly cavity 326. When the closed end 312 of the water jetting component 310 moves to the other end of the assembly cavity 326, the outer wall of the water jetting component 310 engages with the clamping protrusion 32*f*, the resistance to the movement of the water jetting component 310 is significantly increased, thereby tightly clamping the water jetting component 310. In this way, the water jetting component 310 can move smoothly to a preset position within the assembly cavity 326 and can be tightly clamped at an appropriate position.

In some embodiments, to ensure the fountain can be illuminated, at least part of the light-transmitting area 322 and the water jetting hole 313 are located on the same side of the fountain light assembly 300 which is configured to face the direction of the swimming pool.

In this embodiment, after the water jetting component 310 and the lamp assembly 320 are assembled together, the light-transmitting area 322 and the water jetting hole 313 are located on the same side of the fountain light assembly 300 which faces the swimming pool when the solar-powered pool fountain light is in operation, allowing the light emitted from the light-transmitting area 322 to illuminate both the swimming pool and the fountain emitted from the water jetting hole 313 simultaneously.

In this embodiment, the light-transmitting area 322 extends along the length direction of the housing 321, and there are multiple water jetting holes 313 arranged at intervals along the length direction of the housing 321. The water jetting holes 313 are arranged correspondingly to the light-transmitting area 322, such that the water ejected from the water jetting holes 313 can be illuminated by the light emitted from the light-transmitting area 322. In this way, the multiple water jetting holes 313 simultaneously eject water jets outwards, forming a water curtain fountain. The water curtain fountain can be illuminated by the light emitted from the light-transmitting area 322, allowing users to enjoy a beautiful fountain at night.

In some embodiments, to ensure that the water jet ejected from the water jetting hole 313 can be illuminated, when the solar-powered pool fountain light is in use, the water outlet hole is positioned above the light-transmitting area 322. This arrangement ensures that the water jet ejected from the water jetting hole 313 passes through the illuminated area of the light-transmitting area 322 as the water jet descends into the swimming pool, thereby illuminating the fountain.

In some embodiments, to enhance the operational efficiency of the solar-powered pool fountain light, the number of the fountain light assembly 300 is two, and the two fountain light assemblies 300 are respectively located on opposite sides of the solar panel 210 and are arranged in parallel with each other. Alternatively, the number of the fountain light assembly 300 can be multiple, and the multiple fountain light assemblies 300 are arranged at intervals along a circumferential direction of the solar panel 210.

In this embodiment, the number of the fountain light assembly 300 can be two, three, or more.

The following description uses examples of two and three assemblies for illustration.

For ease of description, in the following embodiments, the end of the water supply component 100 extending above the water surface is defined as the mounting end 110, and the solar module 200 is installed on the mounting end 110.

When the number of fountain light assembly 300 is two, the mounting end 110 includes two symmetrically positioned connection ports 113. The two fountain light assemblies 300 are respectively located on opposite sides of the solar panel 210, and the water jetting components 310 of both the fountain light assemblies 300 are respectively connected to and in communication with the corresponding connection port 113. In some embodiments, the two fountain light assemblies 300 are aligned on a straight line, such that the two fountain light assemblies 300 can cooperate to produce fountain light effects distinct from that of a single fountain light assembly.

When the number of the fountain light assembly 300 is three, the mounting end 110 includes three connection ports 113 arranged at intervals. The three fountain light assemblies 300 are evenly spaced along the circumference of the solar panel 210, and the water jetting components 310 of the three fountain light assemblies 300 are respectively connected to and in communication with the corresponding connection port 113. By arranging the three fountain light assemblies 300 in a radial pattern, the fountain light assemblies 300 can cooperate to produce different fountain light effects.

The solar module 200 can engage with the mounting end 110 of the water supply component 100 in many ways. Here is another specific example for illustration.

The solar-powered pool fountain light further includes an installation assembly 500, which includes a fastening portion and a mounting portion 550. The fastening portion is fixedly connected to the mounting end 110. The solar module 200 includes the mounting bracket 220 and the solar panel 210. The solar panel 210 is mounted on the mounting bracket 220, and the mounting bracket 220 is detachably connected to the mounting portion 550.

The fastening portion can be fixedly connected to the mounting end 110 in many ways, such as through clamping, snapping, and using fasteners like screws. In this embodiment, taking the mounting assembly 500 including a first clamping member 510 and a second clamping member 520 as an example, the first clamping member 510 and the second clamping member 520 clamp the mounting end 110 and are fixedly connected to the mounting end 110 by using a snap-fit connection or by using fasteners like screws. The overall shape of the mounting end 110 can vary, such as being T-shaped (which can have two connection ports 113) or L-shaped (which can have one connection port 113).

The first clamping member 510 and the second clamping member 520 can clamp the mounting end 110 at various positions. In an embodiment, the first clamping member 510 and the second clamping member 520 clamp the T-shaped mounting end 110 (the mounting end 110 is T-shaped, including a transverse segment 111 and a longitudinal segment 112). The first clamping member 510 and the second clamping member 520, when being assembled, form a sleeve 560 with a notch 530. The sleeve 560 is sleeved on the transverse segment 111 of the mounting end 110, and the notch 530 is engaged at the connection position between the transverse segment 111 and the longitudinal segment 112. Such configuration ensures that the installation assembly 500 can stably engage with the mounting end 110, thereby preventing positional deviation of the solar module 200 mounted on the mounting portion 550 and improving the assembly stability of the solar module 200.

The mounting portion 550 can be integrally formed with the fastening portion, or can be fixedly mounted on the fastening portion. When the mounting portion 550 is integrally formed with the fastening portion, the mounting portion 550 can be divided into two parts: one part is integrally formed with the first clamping member 510, and the other part is integrally formed with the second clamping member 520. After the first clamping member 510 and the second clamping member 520 are engaged, the two parts of the mounting portion 550 are spliced. When the mounting portion 550 is fixedly mounted on the fastening portion, after the first clamping member 510 and the second clamping member 520 are engaged, the mounting portion 550 is fixedly connected to the connection position between the first clamping member and the second clamping member 520. Simultaneously, the mounting portion 550 fixedly engages with the first clamping member 510 and the second clamping member 520.

The mounting portion 550 can be detachably connected to the mounting bracket 220 in many ways, such as through magnetic adsorption connection, screw fastener connection, and buckle connection. In this embodiment, taking the insertion connection as an example, one of the mounting portion 550 and the mounting bracket 220 is provided with an insertion hole, and the other is provided with an insertion protrusion. For example, the mounting bracket 220 is provided with an insertion hole on the side thereof facing away from the solar panel 210, and the mounting portion 550 is provided with an insertion protrusion.

The first electrical connector 330 can be electrically connected to the solar panel 210 in many ways. Here is a specific example for illustration. The solar-powered pool fountain light further includes a second electrical connector 600. One end of the second electrical connector 600 is electrically connected to the solar panel 210, and the other end thereof is exposed outside the solar panel 210. The first electrical connector 330 and/or the second electrical connector 600 are flexible electrical connectors. An end of the first electrical connector 330 away from the lighting lamp set **32*d* is inserted into an end of the second electrical connector 600 away from the solar panel 210**.

The second electrical connector 600 can be a rigid electrical connector, such as a rigid electrical terminal, or a flexible electrical connector, such as a wire (with an electrical port at the end) or a flexible circuit board. One end of the second electrical connector 600 is electrically connected to the solar panel 210, and the other end thereof extends out of the solar module 200 to be detachably connected to the first electrical connector 330. The second electrical connector 600 can extend out of the solar module 200 at various positions. In this embodiment, the second electrical connector 600 extends out of the solar module 200 from the position of the connection port 113 of the mounting bracket 220 which is close to the mounting end 110 (the end of the water supply component 100 extending out of the water surface), which allows for the detachable connection between the water jetting component 310 and the water supply component 100, as well as the detachable connection between the second electrical connector 600 and the first electrical connector 330. This significantly reduces the electrical connection distance between the first electrical connector 330 and the second electrical connector 600, simplifying the complexity of the connection, and allowing the overall structure to be more compact. Additionally, since the first electrical connector 330 and the second electrical connector 600 are detachably connected through an insertion connection, and one of the first electrical connector 330 and the second electrical connector 600 is a flexible electrical connector, the first electrical connector 330 and the second electrical connector 600 can be easily connected and disconnected.

In some embodiments, to enhance the adaptability of the solar-powered fountain light, the solar module 200 further includes the mounting bracket 220. The solar panel 210 is mounted on the mounting bracket 220, and the mounting bracket 220 is detachably connected to the water supply component 100. An energy storage battery and a circuit board electrically connected to the energy storage battery are arranged in the mounting bracket 220. The circuit board is electrically connected to the solar panel 210, and the circuit board is provided with a control button 250 and a charging interface 230. The control button 250 and the charging interface 230 are exposed on the mounting bracket 220.

In this embodiment, the energy storage battery arranged inside the mounting bracket 220 is electrically connected to the solar panel 210 through the circuit board, allowing the solar panel 210 to charge the energy storage battery inside the mounting bracket 220. During sunny days, the energy storage battery can receive sufficient energy replenishment from the solar panel 210. On rainy days when sunlight is insufficient, the solar panel 210 cannot provide sufficient energy replenishment to the energy storage battery. At this time, users can charge the energy storage battery through the exposed charging interface 230. By detachably connecting the solar module 200 to the water supply component 100, users can detach the solar module 200 and place the solar module 200 in a suitable location for charging. This eliminates the need to detach and transport the entire solar-powered fountain light from the swimming pool to indoors for charging, or to route indoor power sources to the poolside for charging. As a result, the convenience of charging the solar module 200 is greatly enhanced. This ensures that the solar module 200 can receive sufficient energy replenishment whether sunlight is abundant or insufficient, thereby expanding the scenarios in which users can utilize the solar-powered fountain light and encouraging more frequent use.

In some embodiments, the control button 250 may include a power button 251 and a mode button 252. The power button 251 is configured to control whether the solar module 200 supplies power to the fountain light assembly 300. The mode button 252 can be configured to control which fountain light assembly 300 the solar module 200 supplies power to (when multiple fountain light assemblies 300 are provided). In some embodiments, the mode button 252 can be configured to control the color and lighting mode of the lights in the fountain light assembly 300, such as controlling the light emitted by the lamp assembly 320 to switch between white, blue, red, etc.

The present disclosure further provides a fountain light assembly 300, including the water jetting component 310, the lamp assembly 320, and the first electrical connector 330.

The water jetting component 310 includes the water jetting chamber 315. One end of the water jetting component 310 is the closed end 312, while the other end is the open end 311 in communication with the water jetting chamber 315. The open end 311 is configured to be detachably connected and communicated with the water supply component 100. At least one water jetting hole 313 is defined in the side wall of the water jetting chamber 315, communicating the water jetting chamber 315 with the exterior of the water jetting component 310.

The lamp assembly 320 includes a housing 321, a lighting lamp set **32*d* hermetically sealed within the housing 321, and a first electrical connector 330. A light-transmitting area 322 is provided on the housing 321 at a position corresponding to the lighting lamp set 32*d*, allowing light emitted by the lighting lamp set 32*d* to pass through. The lamp assembly 320 is detachably connected to the water jetting component 310. The light-transmitting area 322 is arranged adjacent to the water jetting hole 313**;

One end of the first electrical connector 330 is electrically connected to the lighting lamp set **32*d*, and the other end of the electrical connector 330 is configured to be electrically connected to the solar panel 210. At least a part of the first electrical connector 330 is in sealing engagement with the housing 321. The first electrical connector 330 extends out of the housing 321 at a position adjacent to the open end 311**.

The fountain light assembly 300 in this embodiment can be any of the forms mentioned in the previous embodiments, and the specific structure can refer to the previous embodiments, which will not be further elaborated here.

In this embodiment, the lamp assembly 320 and the water jetting component 310 of the fountain light assembly 300 are detachably connected, thus, the fountain light assembly 300 can serve as a lighting device and a fountain device, and the lamp assembly 320 and the water jetting component 310 can operate independently of each other. Compared to the technical solution where the two components are integrally configured, the separate configuration facilitates separate processing without requiring a specific processing sequence, thereby enhancing production efficiency. Additionally, configuring the fountain light assembly 300 as an independent structure allows both structures of the fountain light assembly 300 and the water jetting component 310 to be relatively simple (compared to the integral configuration), reducing the difficulty of processing and facilitating the reduction of production technical difficulties and the improvement of production efficiency. Furthermore, in future maintenance, only the damaged light assembly 320 or the water jetting component 310 needs to be replaced, without the need for overall replacement, which reduces maintenance costs. Moreover, the light-transmitting area 322 is arranged adjacent to the water jetting hole 313, which allows the water jet ejected from the water jetting hole 313 to be illuminated, enabling users to not only conveniently use the swimming pool at night but also enjoy the beautiful fountain.

The present disclosure further provides a swimming pool system, which includes the swimming pool and the solar-powered pool fountain light. The specific structure of the solar-powered pool fountain light refers to the above-mentioned embodiment. Since this swimming pool system adopts all the technical solutions of all the above-mentioned embodiments, it at least possesses all the beneficial effects brought by the technical solutions of the above-mentioned embodiments, which will not be elaborated here. The swimming pool system refers to a system that includes a swimming pool, a pool purification system, pool accessories, and a solar-powered pool fountain light.

The above descriptions are merely optional embodiments of the present disclosure and do not thereby limit the scope of the invention. Any equivalent structural transformations made under the inventive concept of the present disclosure, utilizing the contents of the specification and accompanying drawings, or directly/indirectly applied in other related technical fields, are all included within the scope of patent protection of the present disclosure.

What is claimed is:

1. A solar-powered pool fountain light, comprising:

a water supply component having a water supply channel; one end of the water supply channel being in communication with a swimming pool, and the other end of the water supply channel extending above a water surface of the swimming pool;

a solar module being mounted on the water supply component; the solar module comprising a solar panel being exposed above the water surface of the swimming pool; and at least one fountain light assembly, comprising:

a water jetting component detachably connected to the water supply component; wherein the water jetting component comprises a water jetting chamber, at least one water jetting hole is defined in a side wall of the water jetting chamber, and each of the at least one water jetting hole communicates the water jetting chamber with an exterior of the water jetting component; one end of the water jetting component is a closed end, while the other end of the water jetting component is an open end in communication with the water jetting chamber, and the open end is configured to be in communication with the end of the water supply channel that is exposed above the water surface; and a lamp assembly comprising a housing, a lighting lamp set sealed within the housing, and a first electrical connector; wherein a light-transmitting area is provided on the housing corresponding to a position of the lighting lamp set, such that light emitted by the lighting lamp set passes through the light-transmitting area; the lamp assembly is detachably connected to the water jetting component, and the light-transmitting area is arranged adjacent to the water jetting hole;

wherein one end of the first electrical connector is electrically connected to the lighting lamp set, and the other end of the first electrical connector is electrically detachably connected to the solar panel, and at least a part of the first electrical connector is in sealing engagement with the housing.

2. The solar-powered pool fountain light according to claim 1, wherein one of the water jetting component and the housing has an assembly cavity and an assembly opening in communication with the assembly cavity, and the other of the water jetting component and the housing is able to being detachably inserted into the assembly cavity through the assembly opening; and after the water jetting component and the housing are assembled, the water jetting hole is exposed.

3. The solar-powered pool fountain light according to claim 2, wherein the assembly cavity extends along a length direction of the water jetting component, the assembly cavity and the water jetting chamber are arranged independently of each other, and the assembly opening is located at one end of the water jetting component;

the housing is inserted into the assembly cavity through the assembly opening and is in parallel with the water jetting component; and a side wall of the assembly cavity is provided with a light-transmitting structure configured to allow light emitted from the self-transmitting area to illuminate the exterior of the water jetting component.

4. The solar-powered pool fountain light according to claim 2, wherein the assembly cavity extends along a length direction of the housing, the assembly opening is located at one end of the housing, and the water jetting component is inserted into the assembly cavity through the assembly opening and is in parallel with the housing.

5. The solar-powered pool fountain light according to claim 4, wherein an avoidance opening is formed in a side wall of the assembly cavity; the avoidance opening extends along a length direction of the side wall of the assembly cavity, and the water jetting hole is exposed through the avoidance opening.

6. The solar-powered pool fountain light according to claim 4, wherein an insertion groove is formed in an inner wall of the assembly cavity, and the insertion groove extends to the assembly opening along a length direction of the assembly cavity; and an outer wall of the water jetting component is provided with an assembly protrusion configured to be inserted into the insertion groove.

7. The solar-powered pool fountain light according to claim 6, wherein an avoidance opening is formed in a side wall of the assembly cavity, and the avoidance opening extends along a length direction of the side wall of the assembly cavity;

the insertion groove is arranged corresponding to the avoidance opening, and the water jetting hole penetrates through a side wall of the water jetting chamber and the assembly protrusion, such that the water jetting hole is exposed on an outer surface of the assembly protrusion; and a part of the assembly protrusion with the water jetting hole is exposed through the avoidance opening.

8. The solar-powered pool fountain light according to claim 7, wherein a disassembly port is formed at an end of the housing away from the assembly opening, and the disassembly port is in communication with the assembly chamber; and when the water jetting component is inserted into the assembly cavity, the closed end is exposed through the disassembly port.

9. The solar-powered pool fountain light according to claim 8, wherein at least a part of the insertion groove is formed in an end wall of the avoidance opening close to the assembly opening, and/or an end wall of the avoidance opening close to the disassembly port.

10. The solar-powered pool fountain light according to claim 4, wherein both the avoidance opening and the light-transmitting area extend along a length direction of the housing, and the avoidance opening and the light-transmitting area are arranged adjacent to each other in a circumferential direction of the housing; and/or, the housing has an inclined side surface, and the avoidance opening and the light-transmitting area are located on the inclined side surface.

11. The solar-powered pool fountain light according to claim 2, wherein a clamping protrusion is arranged on an inner groove wall of the assembly cavity, and the clamping protrusion is configured to tightly clamp an outer side wall of the water jetting component; and the clamping protrusion is located close to one end of the assembly cavity away from the assembly opening, and the clamping protrusion is configured as an arc-shaped strip and extends along a circumference of an inner side wall of the assembly cavity.

12. The solar-powered pool fountain light according to claim 1, wherein at least a part of the light-transmitting area and the water jetting hole are located on a same side of the fountain light assembly which faces the swimming pool, and the first electrical connector extends out of the housing at a position adjacent to the open end.

13. The solar-powered pool fountain light according to claim 12, wherein the light-transmitting area extends along a length direction of the housing, a number of the water jetting hole is multiple, and the multiple water jetting holes are arranged at intervals along the length direction of the housing; the water jetting holes are arranged corresponding to the light-transmitting area, such that water jets from the water jetting holes are illuminated by the light emitted from the light-transmitting area; and/or, when the solar-powered pool fountain light is in operation, a water outlet is located above the light-transmitting area.

14. The solar-powered pool fountain light according to claim 1, wherein a number of the fountain light assembly is two; the two fountain light assemblies are respectively located on opposite sides of the solar panel, and the two fountain light assemblies are arranged in parallel with each other; or a number of the fountain light assembly is multiple, and the multiple fountain light assemblies are arranged at intervals along a circumferential direction of the solar panel.

15. The solar-powered pool fountain light according to claim 1, further comprising a second electrical connector; wherein one end of the second electrical connector is electrically connected to the solar panel, and the other end of the second electrical connector is exposed outside the solar panel; and the first electrical connector and/or the second electrical connector are flexible electrical connectors, and an end of the first electrical connector away from the lighting lamp set is inserted into an end of the second electrical connector away from the solar panel.

16. The solar-powered pool fountain light according to claim 1, wherein the end of the water supply component extending above the water surface of the swimming pool is a mounting end;

the solar-powered pool fountain light further comprises an installation assembly, wherein the installation assembly comprises a fastening portion and a mounting portion, and the fastening portion is fixedly connected to the mounting end; and the solar module further comprises a mounting bracket on which the solar panel is mounted, and the mounting bracket is detachably connected to the mounting portion.

17. The solar-powered pool fountain light according to claim 16, wherein the fastening portion comprises a first clamping member and a second clamping member detachably connected to the first clamping member; the first clamping member and the second clamping member, when being assembled, form a sleeve with a notch; and the mounting end is T-shaped and comprises a transverse segment and a longitudinal segment, the sleeve is sleeved on the transverse segment, and the notch is engaged at a connection position between the transverse segment and the longitudinal segment.

18. The solar-powered pool fountain light according to claim 1, wherein the solar module further comprises a mounting bracket, the solar panel is mounted on the mounting bracket, and the mounting bracket is detachably connected to the water supply component; and an energy storage battery and a circuit board are arranged in the mounting bracket and are electrically connected, the circuit board is electrically connected to the solar panel, and the circuit board is provided with a control button and a charging interface, and both the control button and the charging interface are exposed on the mounting bracket.

19. A fountain light assembly, comprising:

a water jetting component having a water jetting chamber, wherein one end of the water jetting component is a closed end, while the other end is an open end in communication with the water jetting chamber; the open end is configured to be detachably connected to and communicate with a water supply component; at least one water jetting hole is defined in a side wall of the water jetting chamber, and each of the at least one water jetting hole communicates the water jetting chamber with an exterior of the water jetting component; and a lamp assembly comprising a housing, a lighting lamp set sealed within the housing, and a first electrical connector; wherein a light-transmitting area is provided on the housing corresponding to a position of the lighting lamp set to allow light emitted by the lighting lamp set to pass through the light-transmitting area; the lamp assembly is detachably connected to the water jetting component, and the light-transmitting area is arranged adjacent to the water jetting hole;

wherein one end of the first electrical connector is electrically connected to the lighting lamp set, the other end of the first electrical connector is configured to be detachably connected to a solar panel, and at least a part of the first electrical connector is sealing engagement with the housing.

20. A swimming pool system, comprising the solar-powered pool fountain light according to claim 1, wherein the solar-powered pool fountain light is mounted at an edge of the swimming pool.

* * * * *